(12) United States Patent
Davis

(10) Patent No.: US 9,414,208 B2
(45) Date of Patent: *Aug. 9, 2016

(54) METHOD AND APPARATUS FOR GENERATING A SUGGESTED MESSAGE TO BE SENT OVER A NETWORK

(71) Applicant: AT&T Intellectual Property I, L.P., Atlanta, GA (US)

(72) Inventor: Braxton K. Davis, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,103

(22) Filed: Nov. 16, 2015

(65) Prior Publication Data

US 2016/0073241 A1      Mar. 10, 2016

Related U.S. Application Data

(63) Continuation of application No. 13/534,351, filed on Jun. 27, 2012, now Pat. No. 9,191,786.

(51) Int. Cl.
*H04W 4/00* (2009.01)
*H04W 4/12* (2009.01)
*H04L 12/58* (2006.01)

(52) U.S. Cl.
CPC ........ *H04W 4/12* (2013.01); *H04L 51/02* (2013.01)

(58) Field of Classification Search
CPC ..... H04W 4/12; H04W 4/14; H04W 52/0251; H04W 60/04
USPC .......................................... 455/466; 370/338
See application file for complete search history.

(56) References Cited

U.S. PATENT DOCUMENTS

| | | | |
|---|---|---|---|
| 9,191,786 B2 | 11/2015 | Davis | |
| 2008/0032703 A1* | 2/2008 | Krumm | H04W 4/02 455/456.1 |
| 2010/0036918 A1* | 2/2010 | Gupta | G06Q 10/107 709/206 |
| 2011/0035452 A1* | 2/2011 | Gittleman | G06Q 10/107 709/206 |
| 2012/0102091 A1 | 4/2012 | Rao | |

* cited by examiner

*Primary Examiner* — Marcos Batista

(57) ABSTRACT

The present disclosure is a method and apparatus for generating a suggested message. In one embodiment, a method for generating a suggested message includes monitoring, by an application server, a first device operated by a first user, detecting, by the application server, a triggering event relevant to the first user, and automatically generating the suggested message in response to the triggering event, where the suggested message is addressed to a second user.

20 Claims, 7 Drawing Sheets

METHOD AND APPARATUS FOR GENERATING A SUGGESTED MESSAGE TO BE SENT OVER A NETWORK

This application is a continuation of U.S. patent application Ser. No. 13/534,351, filed Jun. 27, 2012, now U.S. Pat. No. 9,191,786, which is herein incorporated by reference in its entirety.

FIELD OF THE DISCLOSURE

The present disclosure relates generally to network communications and relates more particularly to techniques for generating suggested messages to be sent over a communication network.

With the proliferation of mobile communications, it is often difficult to manage the vast amounts of data that are exchanged. What is more, users typically do not have easy access to information that might make the management of this data simpler or cannot access the information in time to take meaningful action. Additionally, users may often be unable to use their mobile communications devices in situations where they are needed, such as when the users are driving and need to relay information to others.

SUMMARY

The present disclosure is a method and apparatus for generating a suggested message. In one embodiment, a method for generating a suggested message includes monitoring, by an application server, a first device operated by a first user, detecting, by the application server, a triggering event relevant to the first user, and automatically generating the suggested message in response to the triggering event, where the suggested message is addressed to a second user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for assisting network communications using artificial intelligence. Embodiments of the disclosure make use of data to which a user might not have easy access and suggest appropriate messages to be sent to other users based on triggering events and/or user preferences observed in this data. In one particular embodiment, suggestions are made to the user while the user has time to act on them. Furthermore, suggestions are generated and presented to the user automatically (i.e., without requiring the user to request the suggestions or explicitly provide any information necessary to generate the suggestions).

Figure 1:
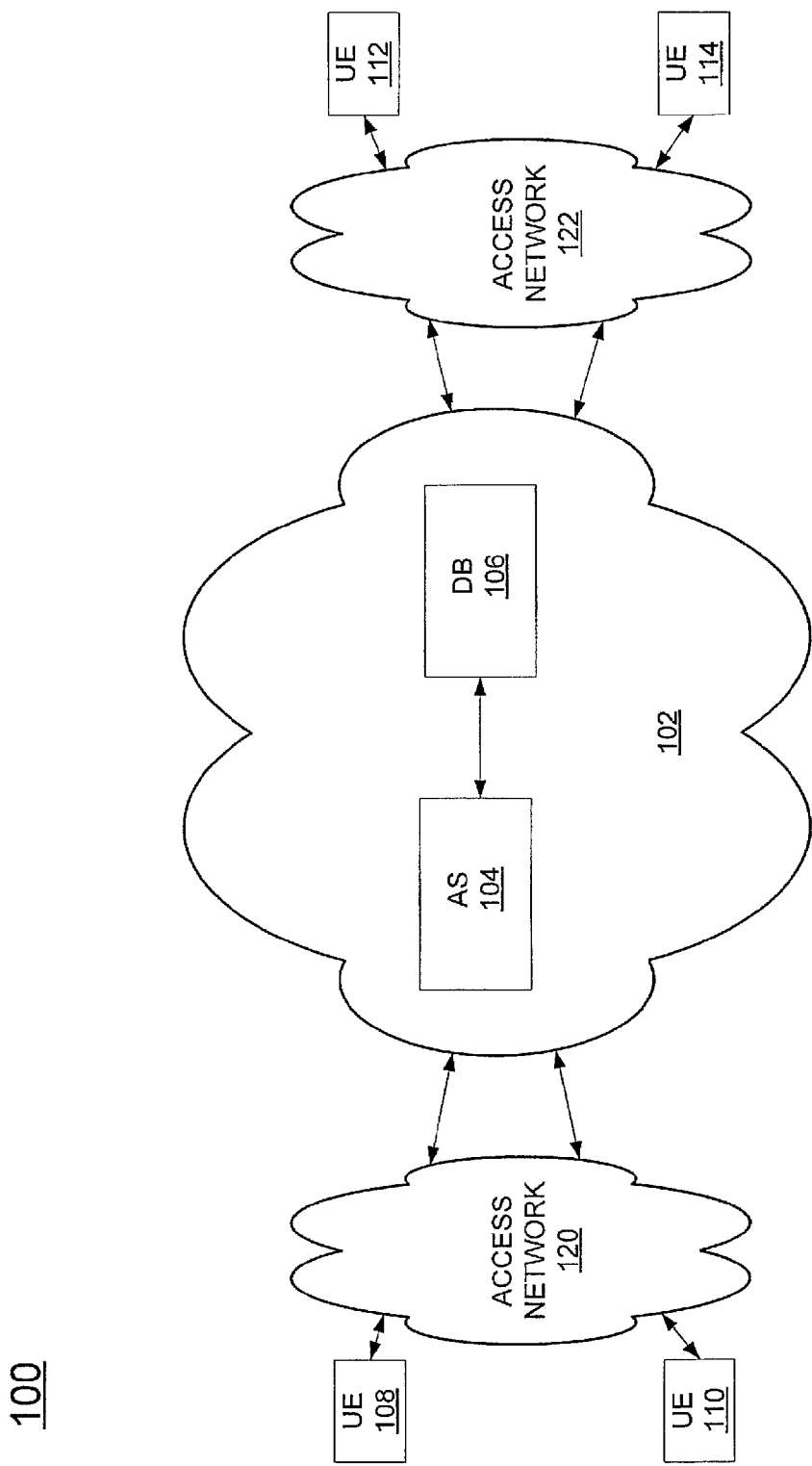
FIG. 1 is a block diagram illustrating an exemplary packet network, configured according to embodiments of the current disclosure.

FIG. 1 is a block diagram depicting one example of a communications network 100. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 4:
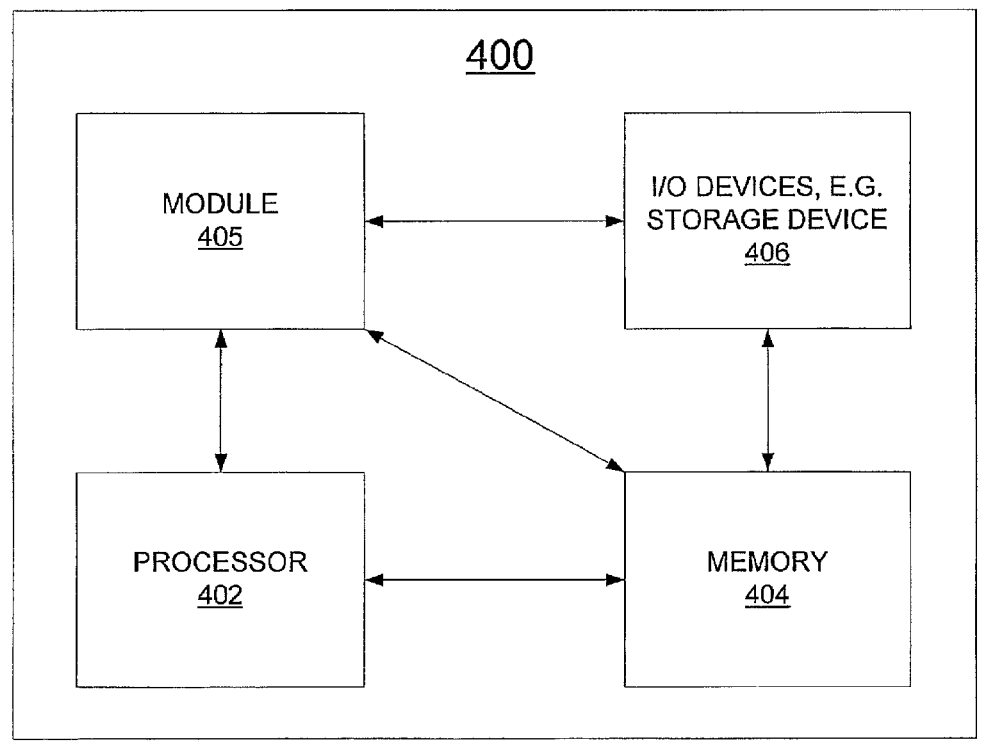
FIG. 4 is a high level block diagram of the message generation method that is implemented using a general purpose computing device.

In one embodiment, the AS 104 may comprise a general purpose computer as illustrated in FIG. 4 and discussed below. In one embodiment, the AS 104 may perform the methods and algorithms discussed below related to generating suggested messages to be sent over a network.

In one embodiment, the DB 106 may store contact information for users of the network 100. For example, the DB 106 may store cellular telephone numbers, email addresses, social media profiles, and the like for each user. In addition, the DB 106 may store information relating to services to which the user is subscribed, including cellular telephone services, Internet services, gaming subscriptions, and social media services.

In one embodiment, the DB 106 stores a user profile that includes a summary of the user's past behavior and a set of user preferences. For example, the summary of the user's past behavior might indicate patterns in the user's responses to particular prompts or events (e.g., the user responded negatively every time she received a message from John inviting her to go on a date). The user preferences might include conditional responses to particular prompts or events (e.g., if John sends a message inviting the user to go on a date, the user wants an affirmative response to be sent to John).

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed. In one embodiment, any of the user endpoint devices may have one or more sensors integrated therein. These sensors may include, for example, location sensors, environmental sensors, acoustic sensors, position sensors, optical sensors, pressure sensors, proximity sensors, and the like. The AS 104 may subscribe to the outputs of these sensors, as discussed in greater detail below.

It should be noted that the network 100 has been simplified. For example, the network 100 may include other network elements (not shown) such as border elements, routers, switches, policy servers, security devices, a content distribution network (CDN) and the like.

Figure 2:
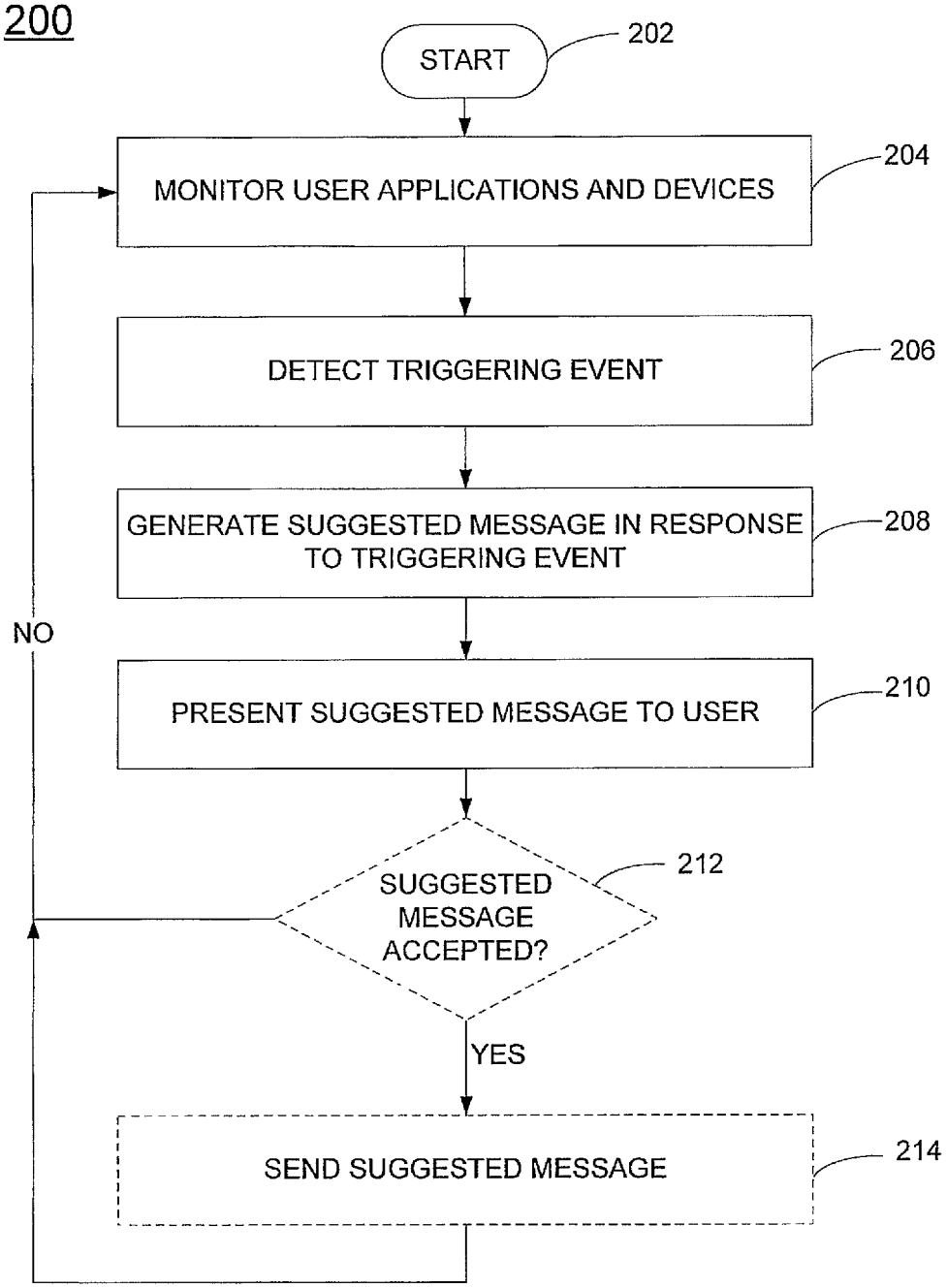
FIG. 2 illustrates a flowchart of a method for generating a suggested message to be sent over a network.

FIG. 2 illustrates a flowchart of a method 200 for generating a suggested message to be sent over a network. In particular, the method 200 generates suggested messages that may aid a user in communicating with others. In one embodiment, the method 200 may be performed by the AS 104 or a general purpose computing device as illustrated in FIG. 3 and discussed below.

The method 200 begins at step 202. At step 204, the application server 104 monitors user applications and endpoint devices. The endpoint devices may include, for example, any of the user endpoint devices described above in connection with FIG. 1. The applications may include, for example, communication applications, calendar applications, navigation applications, search applications, media applications, and the like. The communication applications may include, for example, applications that allow communication over a cellular, IP, or circuit-switched network, a short message service (SMS), a multimedia message service (MMS), an instant message (IM) service, an email service, a social media network, or the like. In one embodiment, monitoring includes receiving or identifying the locations and positions of the user devices (e.g., from other devices), the active applications on the user devices, and the current activities on the user devices (including, for example, incoming and outgoing messages). Thus, to this end, the monitoring may include observing the outputs of one or more sensors integrated with the user endpoint devices. In one embodiment, the method 200 monitors the applications and devices of multiple users.

At step 206, the application server 104 detects a triggering event. A triggering event within the context of the present disclosure is an event that prompts a response from the user. Thus, the triggering event might be the receipt of a message, the movement of the user device within a certain geographic radius, the execution of a search on the user device, or the expiration of a calendar entry, among other events. In one embodiment, the triggering event is predefined (e.g., as the premise of a conditional statement). The triggering event may be predefined by the user, by the user device, or by a device other than the user device. For example, in one embodiment, the user may program the user device to respond to particular triggering events in particular ways. In another embodiment, the user device may be pre-programmed to respond to particular triggering events in particular ways, or may learn over time (e.g., based on observations of the user's interactions) to respond to particular triggering events in particular ways. In still a further embodiment, a device other than the user device may request that the user device respond to particular triggering events in particular ways. Where the triggering event is predefined by the user device or another device, the user's permission may be sought before storing the triggering event and associated response. However, in other embodiments, the triggering event may be identified automatically based on observation of past user behavior (e.g., the user always responds to messages from a particular person).

At step 208, the application server 104 generates a suggested message in response to the triggering event. In one embodiment, the suggested message relies at least in part on a user profile. The user profile may store preferences that indicate how a user wishes to or tends to respond to events of particular types. For instance, if the triggering event is the premise of a conditional statement stored in a user profile, the suggested message might include the conclusion of the conditional statement (e.g., if John sends the user a message asking the user on a date, respond affirmatively to John). Alternatively, the user profile may define patterns that indicate how the user has responded to similar triggering events in the past (e.g., the user has always responded negatively when John has sent messages asking the user on a date). In a further embodiment, the suggested message is based at least in part on the status of one of more of the user applications and devices (e.g., as indicated by sensor outputs). For instance, if the triggering event is an appointment that is scheduled for ten minutes from now, and the method 200 detects that the user is approximately fifteen minutes away from the appointment location (e.g., based on the output of a location sensor integrated in the user's cellular phone, such as a global positioning system sensor), the suggested message might include a message to be sent to the person with whom the user is meeting informing that person that the user will be late.

At step 210, a user endpoint device 108 presents the suggested message to the user. For instance, the method 200 may display a dialog on the display of one of the user's devices, where the dialog presents the suggested message and asks for permission to send the suggested message to the intended recipient (e.g., "John has sent you a message asking you on a date. Respond affirmatively? Yes/No."). In one embodiment, the suggested message includes an option for the user to edit the suggested message.

At optional step 212 (illustrated in phantom), the user endpoint device 108 receives a selection from the user in response to the suggested message. In one embodiment, the user either approves the suggested message or disapproves the suggested message. If the user disapproves the suggested message, then in one embodiment, no further action is necessary. In this embodiment, the method 200 may thus return to step 204 and the application server 104 will continue to monitor the user applications and endpoint devices as described above. In another embodiment, however, the application server 104 may present the user with an alternative suggested message. However, if the user approves the suggested message, then the method 200 proceeds to optional step 214. It is noted that the user may edit the suggested message prior to approving the suggested message.

At optional step 214 (illustrated in phantom), the user endpoint device 108 sends the suggested message. In one embodiment, the suggested message is sent along with changes suggested by the user. For instance, the user may wish to modify a proposed message that is to be sent to another person (e.g., respond affirmatively to John, but suggest a date on Saturday instead of Sunday). The method 200 then returns to step 204 and the application server 104 continues to monitor the user applications and endpoint devices as described above. In a further embodiment, certain details of steps 212 and 214 may be stored in the user profile in order to update the user profile. For instance, the way in which the user responds to the triggering action, including any modifications the user makes to suggested messages provided in response to the triggering action, may help refine the preferences and history that are stored in the user profile.

As a result, the method 200 helps users respond to events in a timely manner by observing and tracking data to which the user might not have easy access or might not pay attention.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Moreover, although certain operations are described as being performed by the application server or by the user endpoint device 108, it should be noted that in other embodiments, the operations may be handled differently. For instance, in one embodiment, the user endpoint device 108 may perform all steps of the method 200 with little or no assistance from the application server 104. Alternatively, the application server 104 may perform all steps of the method 200 with little or no assistance from the user endpoint device 108.

As alluded to above, the method 200 may be implemented in a variety of ways to generate a suggested message to be sent over a network. FIGS. 3A-3D illustrate various triggering events that might prompt the present disclosure to generate suggested message. For instance, in one embodiment illustrated in FIG. 3A, the triggering event is an incoming message. Responding to the incoming message may include a review of monitored user applications, such as a calendar application. As an example, the user might receive a text message from April asking if the user wants to meet for dinner tonight. The suggested message might include a suggested affirmative response (e.g., "Yes, I'd like to meet you at 6:00 PM."). Alternatively, the method 200 may, upon checking the user's calendar application, detect that the user already has plans tonight. In this case, the suggested message might include a suggested negative response (e.g., "I'm sorry, I already have plans. Maybe another time?").

In a further embodiment, generating a suggested message in response to an incoming message might include a review of the user's profile to determine whether the user's preferences or past behavior dictate a particular response. For instance, the user may have sent several messages to April in the past declining invitations for dinner. In this case, the method 200 might suggest that the user respond negatively to April. Alternatively, the user's profile might indicate that the user wishes to accept any dinner invitations from April. In this case, the method 200 might suggest that the user respond affirmatively to April.

Figure 3A:
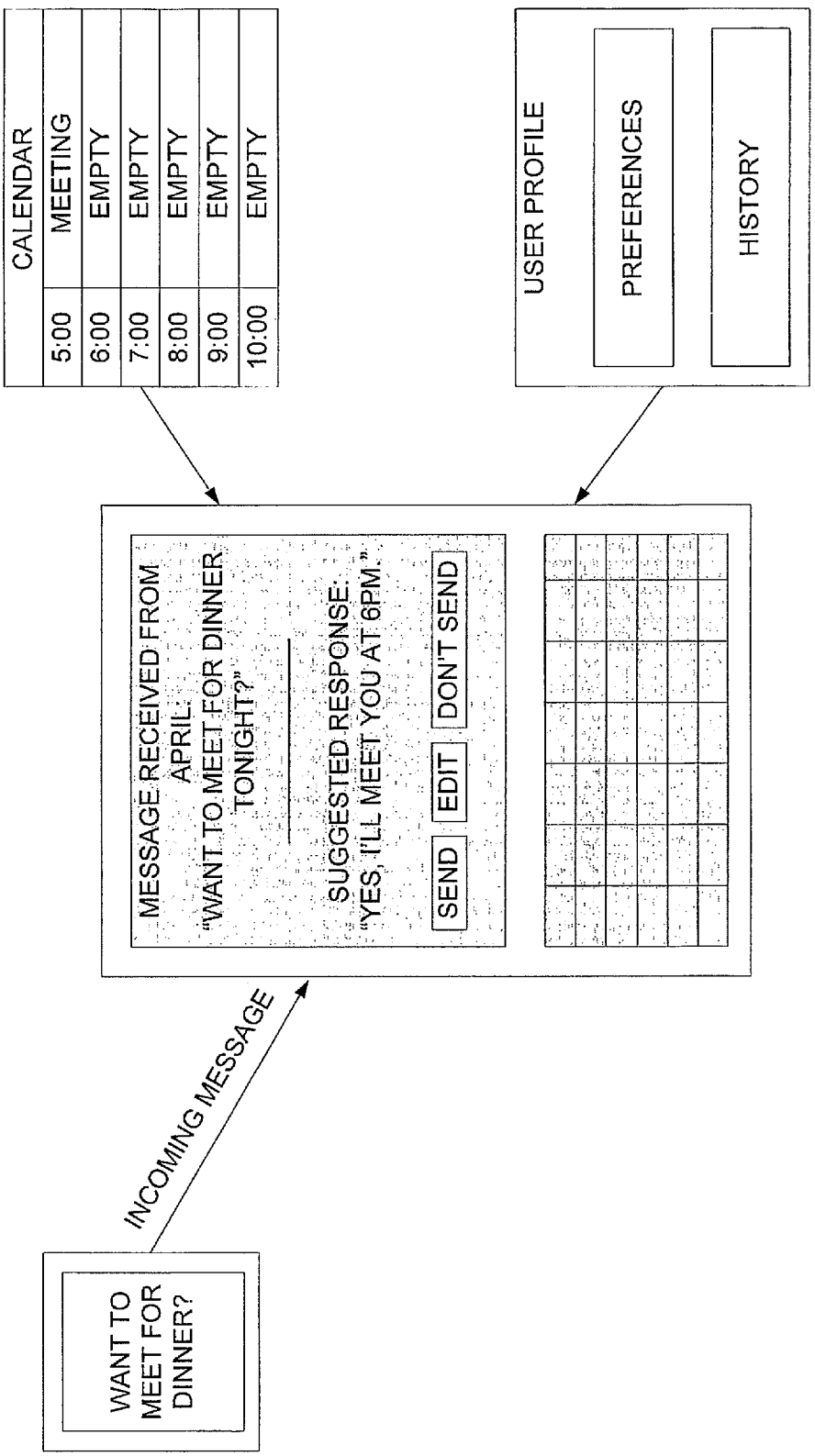
FIGS. 3A-3D illustrate various triggering events that might prompt the present disclosure to generate suggested message.
Figure 3B:
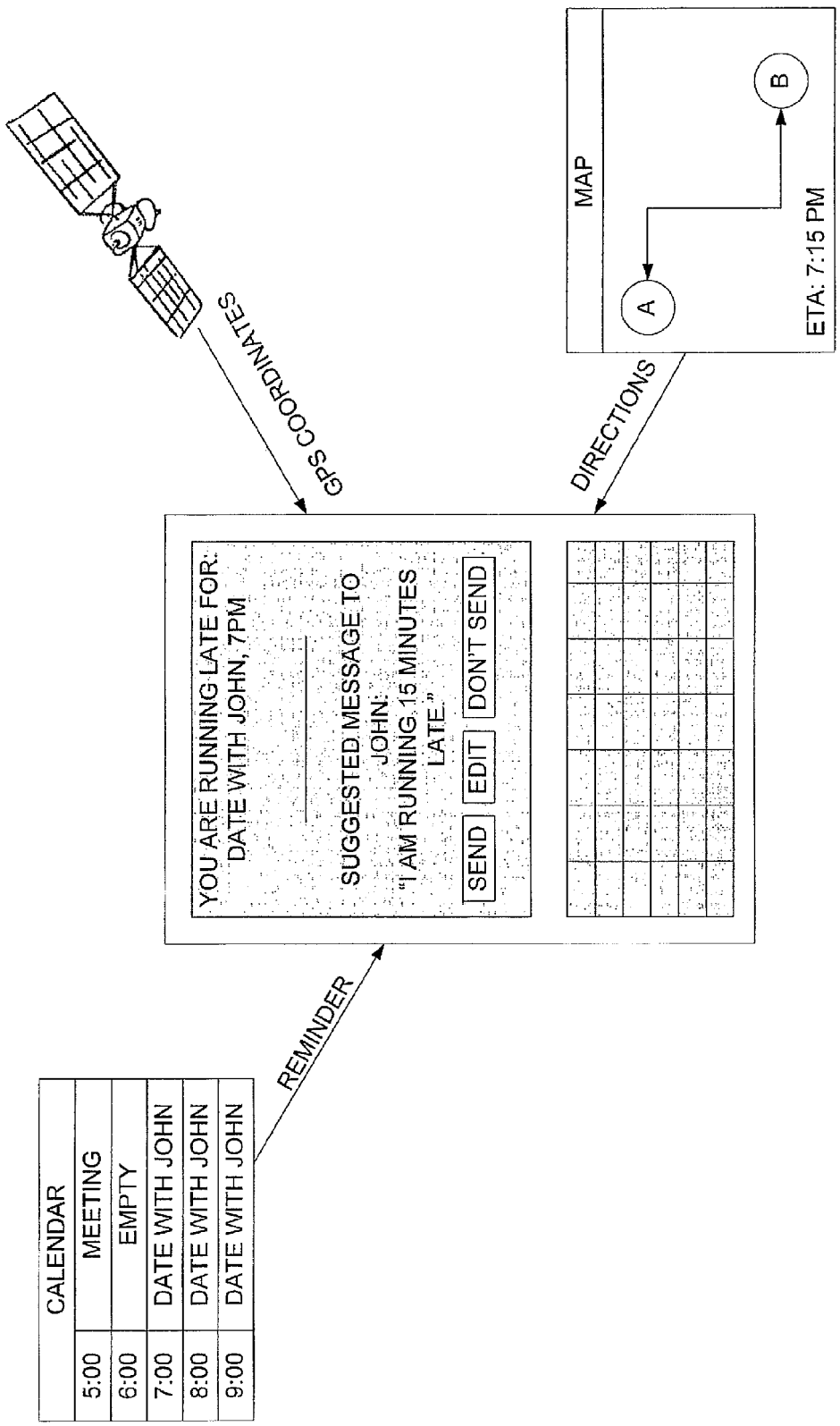

In another embodiment illustrated in FIG. 3B, the triggering event is an appointment in the user's calendar application. Generating suggested messages relevant to appointments may include a review of the outputs of sensors integrated in the monitored user devices (e.g., speed sensors, location sensors, clocks, etc.), as well as a review of monitored user applications. For instance, a triggering event might be a reminder for a 7:00 PM date with John. The method 200 may further detect location sensor output indicating that the user is leaving her office. Accordingly, the method 200 may calculate the distance from the user's office to the date location and conclude that the user will be fifteen minutes late. In this case, the method 200 might suggest that the user send John a text message alerting him to the fact that she will be late (e.g., "I am running about fifteen minutes late.")

Figure 3C:
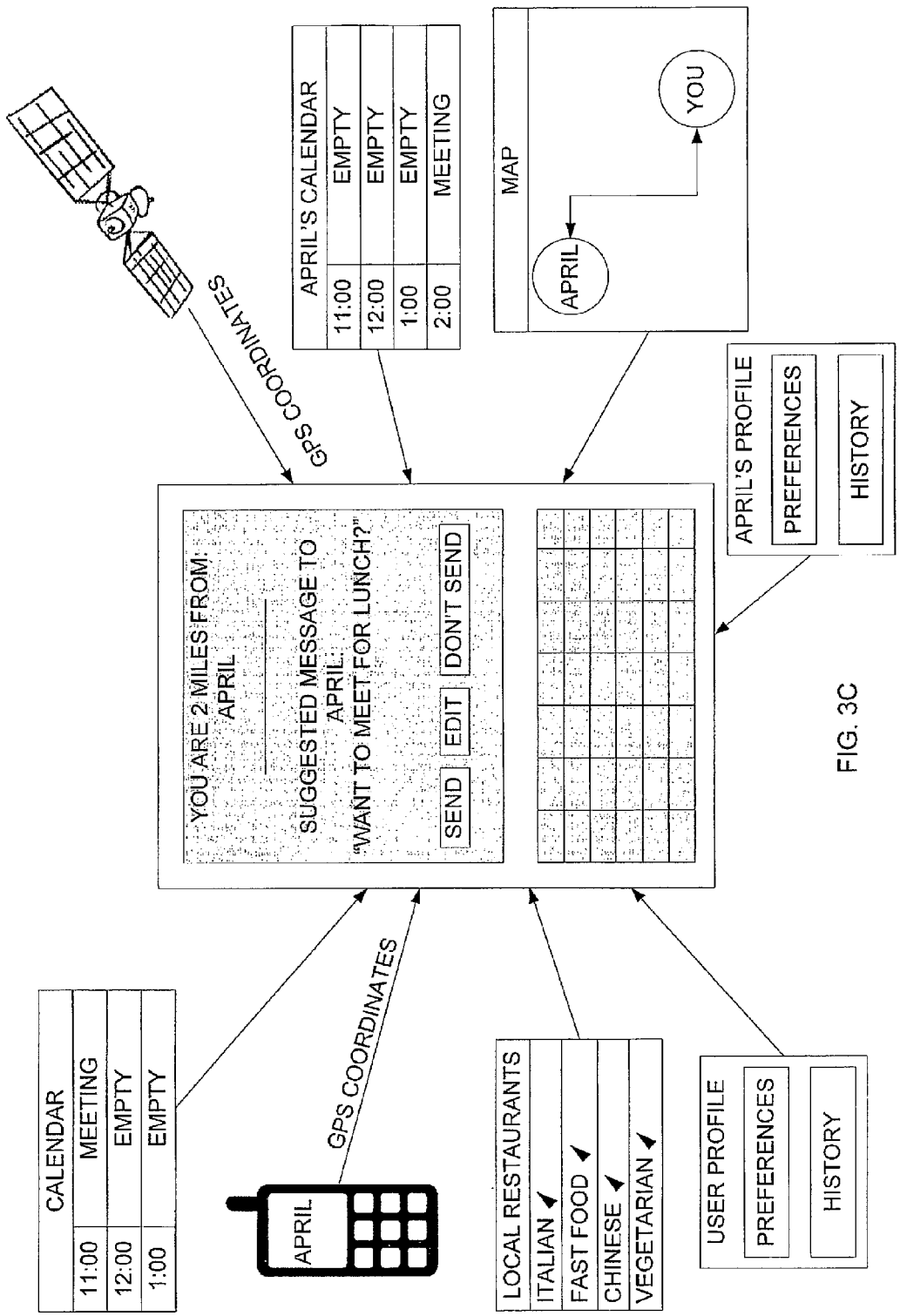

In another embodiment illustrated in FIG. 3C, the triggering event is an unscheduled or spontaneous a social opportunity. For instance, a triggering event may include the method 200 detecting (e.g., based on an analysis of the outputs of location sensors integrated into the user's cellular phone and her friend's cellular phone) that the user's present geographic location is within a threshold distance (e.g., two miles) from her friend's present geographic location. The method 200 may further detect, based on a review of the user's calendar application and the friend's calendar application, that the user and the friend are both free around lunch time. In this case, the method 200 might suggest that the user send a message to her friend to try to arrange a meeting (e.g., "Do you want to meet for lunch in an hour?").

In a further embodiment still, the method 200 might review the user's profile and the friend's profile for food preferences (e.g., the user may be a vegetarian, or the friend's favorite type of food might be Chinese). The profile information and location information may be used by the method 200 to perform a search of local restaurants for potential lunch locations and directions thereto.

Figure 3D:
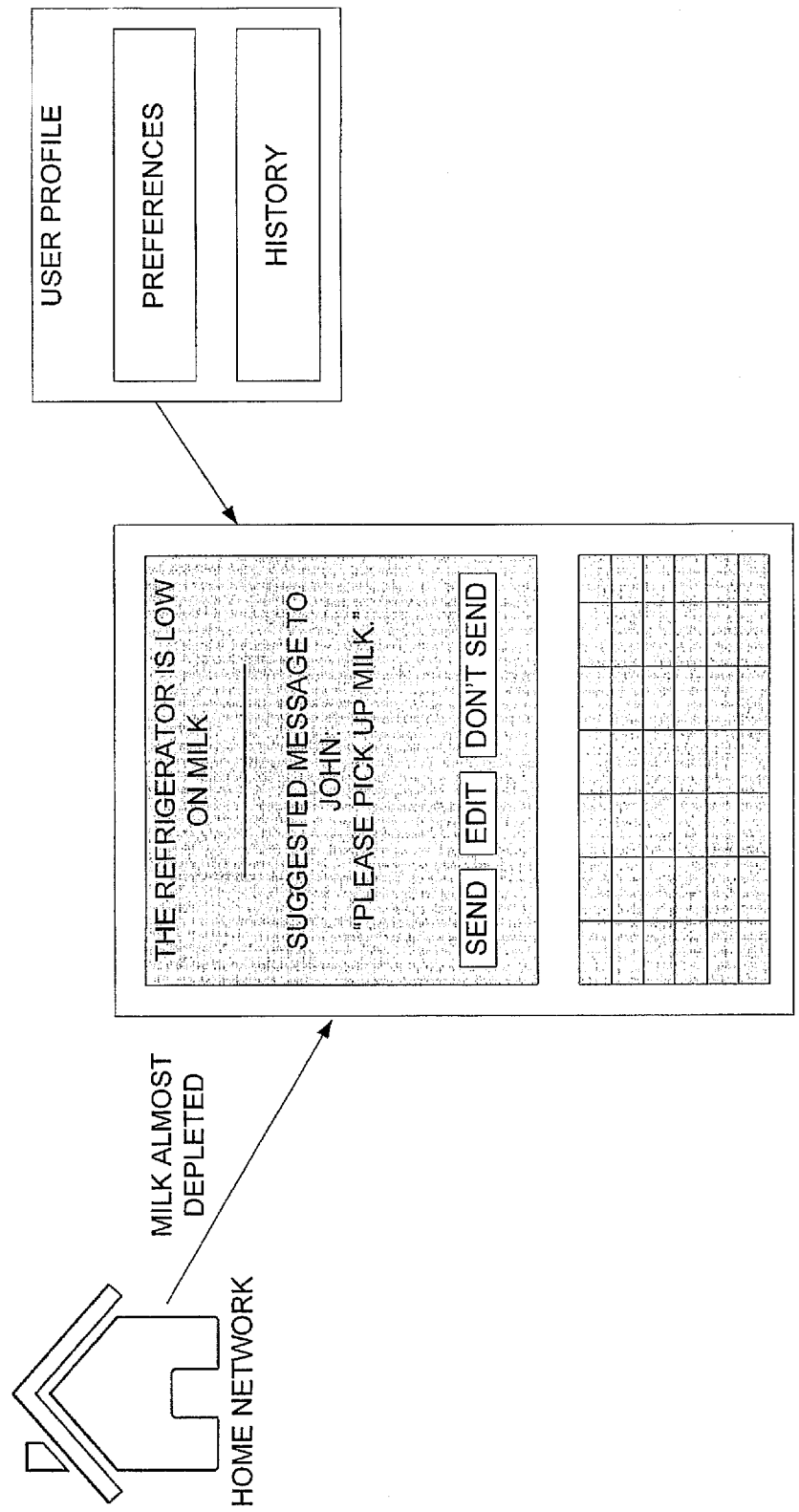

In another embodiment illustrated in FIG. 3D, the triggering event is a status change related to the user's networked home devices. Networked home devices may include various home appliances and computing devices, such as a refrigerator, a washing machine or dryer, a dishwasher, an oven, a home computer, a set top box, a gaming console, a telephone, or the like. For instance, the method 200 might subscribe to the output of a sensor that monitor's the user's refrigerator inventory. A triggering event might be a sensor output indicating that the inventory is low on milk. Moreover, the user's profile might indicate that when the inventory is low, a message should be sent to John asking him to pick up the necessary items. Thus, the method 200 might suggest that the indicated message be sent to John (e.g., "Please pick up milk on your way home from work.").

FIG. 4 depicts a high-level block diagram of a general-purpose computer suitable for use in performing the functions described herein. The general-purpose computing device may be part of the application server 104 or one of the user endpoint devices 108-114 described above. As depicted in FIG. 4, the system 400 comprises a hardware processor element 402 (e.g., a CPU), a memory 404, e.g., random access memory (RAM) and/or read only memory (ROM), a module 405 for generating suggested messages, and various input/output devices 406, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 405 for generating suggested messages can be loaded into memory 404 and executed by hardware processor 402 to implement the functions as discussed above. As such, the present module 405 for generating suggested messages as discussed above in method 200 (including associated data structures) of the present disclosure can be stored on a non-transitory (e.g., tangible or physical rather than a propagating signal) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating a suggested message, the method comprising:
   detecting, by an application server, a triggering event relevant to a first user;
   automatically generating, by the application server, the suggested message in response to the triggering event, where the suggested message is addressed to a second user, wherein the suggested message comprises a suggestion to be acted on by the first user;
   providing, by the application server, the suggested message to a first device of the first user;
   receiving, by the application server, a response from the first user, wherein the response indicates whether to send the suggested message to the second user; and
   sending, by the application server, the suggested message to the second user when the response from the first user indicates that the suggested message is to be sent to the second user.

2. The method of claim 1, wherein the triggering event is a message received by the first device.

3. The method of claim 1, wherein the triggering event is a reminder generated by a calendar application associated with the first device.

4. The method of claim 1, wherein the triggering event is an execution of a search on the first device.

5. The method of claim 1, wherein the triggering event is detected in an output of a sensor.

6. The method of claim 5, wherein the sensor is integrated in the first device.

7. The method of claim 6, wherein the output of the sensor is a present geographic location of the first device.

8. The method of claim 5, wherein the sensor is integrated in a second device.

9. The method of claim 8, wherein the second device is operated by the second user.

10. The method of claim 9, wherein the output of the sensor is a present geographic location of the second device.

11. The method of claim 8, wherein second device resides in a residence of the first user.

12. The method of claim 1, wherein the automatically generating the suggested message further comprises:
   consulting a profile associated with the first user.

13. The method of claim 12, wherein the profile stores a user preference.

14. The method of claim 13, wherein the user preference is a conditional statement in which a premise of the conditional statement is the triggering event and a conclusion of the conditional statement is used to generate the suggested message.

15. The method of claim 12, wherein the profile stores a pattern derived from a communication history associated with the first user.

16. The method of claim 1, wherein the response includes a change made by the first user to the suggested message.

17. A non-transitory computer readable medium containing an executable program for generating a suggested message, where the executable program, when executed by an application server, causes the application server to perform operations, the operations comprising:
   detecting a triggering event relevant to a first user;
   automatically generating the suggested message in response to the triggering event, where the suggested message is addressed to a second user, wherein the suggested message comprises a suggestion to be acted on by the first user;
   providing the suggested message to a first device of the first user;
   receiving a response from the first user, wherein the response indicates whether to send the suggested message to the second user; and
   sending the suggested message to the second user when the response from the first user indicates that the suggested message is to be sent to the second user.

18. The non-transitory computer readable medium of claim 17, wherein the automatically generating the suggested message further comprises:
   consulting a profile associated with the first user.

19. A system for generating a suggested message, the system comprising:
   a processor; and
   a computer readable medium containing an executable program that causes the processor to perform operations, the operations comprising:
      detecting a triggering event relevant to a first user;
      automatically generating the suggested message in response to the triggering event, where the suggested message is addressed to a second user, wherein the suggested message comprises a suggestion to be acted on by the first user;
      providing the suggested message to a first device of the first user;
      receiving a response from the first user, wherein the response indicates whether to send the suggested message to the second user; and
      sending the suggested message to the second user when the response from the first user indicates that the suggested message is to be sent to the second user.

20. The system of claim 19, wherein the response includes a change made by the first user to the suggested message.

* * * * *